(12) United States Patent
Tsirkin

(10) Patent No.: US 11,307,888 B2
(45) Date of Patent: Apr. 19, 2022

(54) MANAGING HOST HARDWARE CONFIGURATION FOR VIRTUAL MACHINE MIGRATION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 11 days.

(21) Appl. No.: 16/801,761

(22) Filed: Feb. 26, 2020

(65) Prior Publication Data
US 2021/0263761 A1    Aug. 26, 2021

(51) Int. Cl.
*G06F 9/455* (2018.01)
*G06F 9/445* (2018.01)
*G06F 9/50* (2006.01)
*G06F 9/54* (2006.01)

(52) U.S. Cl.
CPC ...... *G06F 9/45558* (2013.01); *G06F 9/44505* (2013.01); *G06F 9/5027* (2013.01); *G06F 9/54* (2013.01); *G06F 2009/4557* (2013.01); *G06F 2009/45575* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 5,253,344 A * | 10/1993 | Bostick | G06F 15/177 710/8 |
| 8,209,680 B1 | 6/2012 | Le et al. | |
| 9,639,340 B2 * | 5/2017 | Araujo | G06F 9/445 |
| 9,852,100 B2 | 12/2017 | Tsirkin et al. | |
| 9,858,098 B2 | 1/2018 | Tsirkin | |
| 9,921,865 B2 | 3/2018 | Tsirkin | |
| 10,248,454 B2 | 4/2019 | Sakai | |
| 10,437,308 B2 | 10/2019 | Tsirkin | |
| 10,514,942 B2 | 12/2019 | Tsirkin | |
| 2008/0256530 A1 | 10/2008 | Armstrong et al. | |

* cited by examiner

*Primary Examiner* — Charlie Sun
(74) *Attorney, Agent, or Firm* — Lowenstein Sandler LLP

(57) ABSTRACT

Systems and methods of the disclosure include: receiving, by a destination host computer system, a source hardware configuration data structure describing a hardware configuration of a source host computer system; receiving at least a part of a state of a virtual machine being migrated from the source host computer system to the destination host computer system; generating a destination hardware configuration data structure describing a hardware configuration of the destination host computer system; starting the virtual machine on the destination host computer system; comparing the source host configuration data structure and the destination host configuration data structure; responsive to detecting a difference between the source host configuration data structure and the destination host configuration data structure, notifying the virtual machine of a hardware configuration change; receiving, from the virtual machine, a hardware configuration request; and providing the destination hardware configuration data structure to a memory accessible by the virtual machine.

20 Claims, 7 Drawing Sheets

MANAGING HOST HARDWARE CONFIGURATION FOR VIRTUAL MACHINE MIGRATION

TECHNICAL FIELD

The implementations of the disclosure generally relate to computer systems and, more specifically, to systems and methods for managing host hardware configuration for virtual machine migration.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization permits multiplexing of an underlying host computer system between different virtual machines. Accordingly, the host computer system typically allocates some of its resources to each of the virtual machines. Each virtual machine can then be able to use the allocated resources to execute applications, including operating systems (referred to as guest operating systems (OS)).

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware. In certain implementations, the hypervisor may virtualize the physical hardware by presenting a virtual machine with one or more virtual devices emulating corresponding physical devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
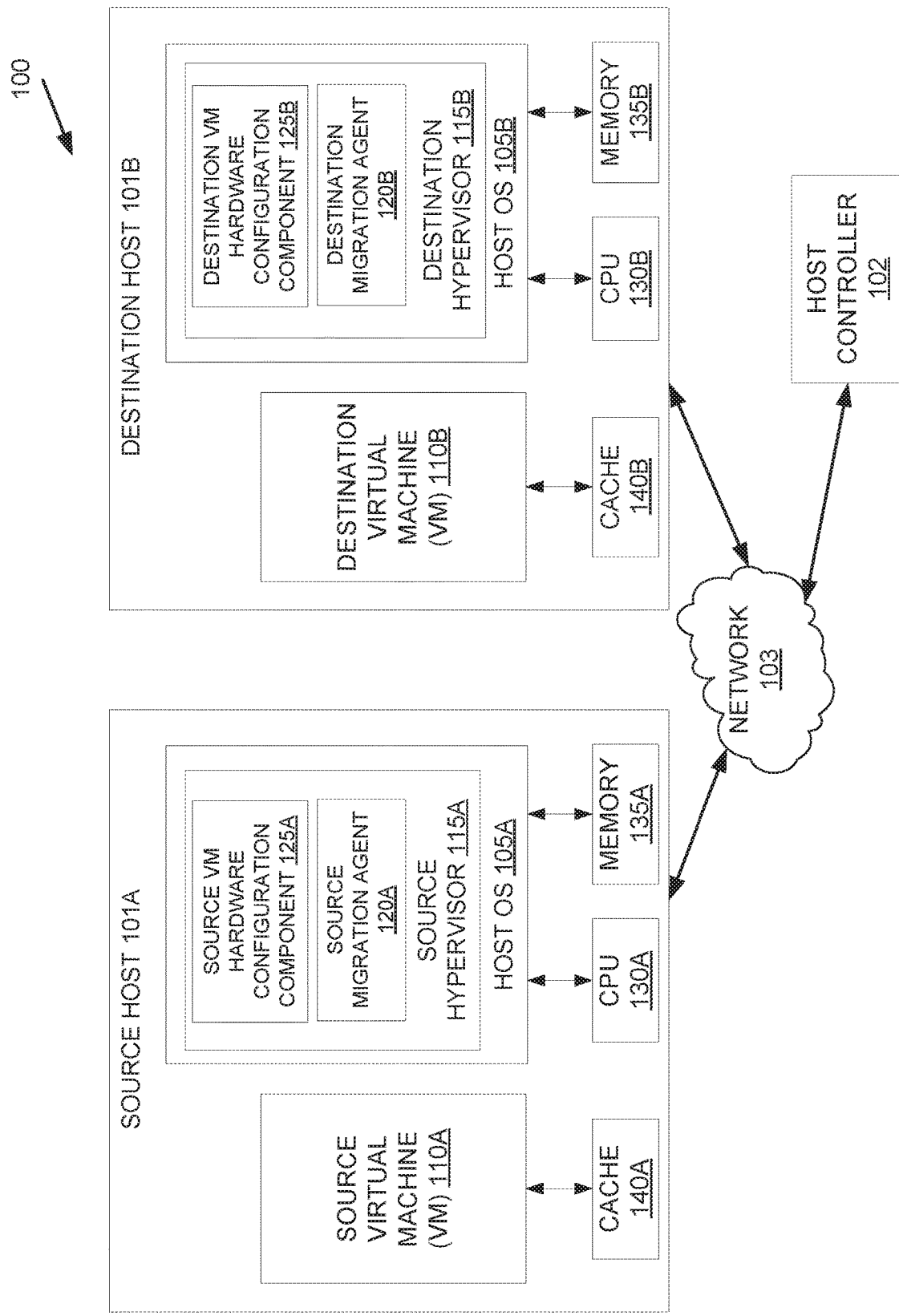
FIG. 1 is a block diagram that illustrates sample virtualization architecture in accordance with one or more aspects of the present disclosure.

Described herein are systems and methods for managing host hardware configuration for virtual machine migration. A virtual machine can utilize one or more hardware configuration data structures (e.g., tables, lists) to store configuration parameters of the underlying physical hardware allocated by a host computer system. In virtualized environments, a hypervisor can generate certain hardware configuration tables and provide the hardware configuration tables to one or more virtual machines. Thus, the hypervisor can present the abstraction of the hardware layer to the virtual machines. In some implementations, the hypervisor can generate hardware configuration tables in accordance with the Advanced Configuration and Power Interface (ACPI) Specification. The ACPI Specification provides an open standard for device configuration and power management by the guest operation system.

A virtual machine can be migrated from a host computer system ("the source host computer system") to another host computer system ("the destination host computer system") over a network. As a result of the migration, the hardware configuration tables of the virtual machine may need to be changed because the underlying hardware of the destination host computer system can be different from the hardware of the source host computer system. However, neither the hypervisor of the source host computer system ("the source hypervisor") nor the hypervisor of the destination host computer system ("the destination hypervisor") can change the hardware configuration tables loaded in the migrated virtual machine after the virtual machine initialization is complete, because the virtual machine can cache the hardware configuration tables at memory locations which are not known to the hypervisor.

Aspects of the present disclosure address the above noted issues by providing systems and methods of managing host hardware configuration for virtual machine migration. The source host computer system and the destination host computer system can have at least partially overlapping hardware configurations, e.g., when the source host computer system and the destination host computer system are a part of the same cluster of host computer systems. Accordingly, the source hypervisor can provide, to a virtual machine that is being migrated from the source host computer system to the destination host computer system, a partial hardware configuration describing hardware configuration parameters that are shared by the source host computer system and the destination host computer system. Despite of having these descriptions, the migrated virtual machine would still lack complete hardware configuration of the destination host computer system until the destination hypervisor provides new hardware configuration tables. Accordingly, the migrated virtual machine cannot be able to perform at a full capacity until the new hardware configuration tables are loaded.

In one implementation, the destination host computer system can determine whether hardware configuration of the virtual machine should be updated based on a comparison between the source host hardware configuration received from a source host system and the destination host hardware configuration. Upon determining that hardware configuration of the virtual machine should be updated (e.g., if there is a difference between the two host hardware configuration), the destination host system can notify the migrated virtual machine of the difference between the source host configuration and the destination host configuration. In response, the virtual machine can request the new hardware configuration (i.e., the destination hardware configuration) and update its internal data structures storing the hardware configuration.

In another implementation, the source host computer system can determine whether hardware configuration of a migrated virtual machine needs to be updated based on the source host configuration and the destination host hardware configuration received from the destination host computer system. In response to determining that the two host hardware configuration are different, the source host computer system can notify the destination host computer system of the difference so that the hardware configuration of the virtual machine can be updated. Accordingly, the destination host computer system can notify the virtual machine of the change in the hardware configuration. In response, the virtual machine can request the destination host computer system to provide the destination hardware configuration data structure so that the hardware configuration of the virtual machine can be up-to-date.

Various aspects of the above referenced methods and systems are described in details herein below by way of examples, rather than by way of limitation. For brevity, simplicity and by way of example, a hypervisor performs many of the operations described herein. It is contemplated that other actors can perform some or all of the operations described herein, including a host operating system, multiple hypervisors, a migration manager, and the like, including a combination thereof.

FIG. 1 is a block diagram that illustrates sample virtualization architecture 100 in accordance with one or more aspects of the present disclosure. The virtualization architecture 100 can include a source host computer system 101A, a destination host computer system 101B, and a host controller 102. The source host computer system 101A, destination host computer system 101B, and a host controller 102 can be communicably connected over a network 103. The network 103 can be a private network (e.g., a local area network (LAN), a wide area network (WAN), intranet, etc.) or a public network (e.g., the Internet).

The source host computer system 101A and destination host computer system 101B can be a server, a workstation, a personal computer (PC), a mobile phone, a smart phone, a mobile computing device, a personal digital assistant (PDA), tablet, laptop computer, thin client, etc. The source host computer system 101A and destination host computer system 101B can include one or more physical central processing units (CPUs) 130A-130B, memory 135A-135B, and physical devices (not illustrated) (also referred to as "host hardware," or "host devices"). The physical devices can be any type of devices, including a data storage device or mass storage device, such as a magnetic or optical storage based disk, tape or hard drive. Other examples of physical devices can include network devices, graphics devices, system components (e.g., bridges, ports, buses) media devices, (e.g., video cards, sounds cards, etc.).

The source host computer system 101A and destination host computer system 101B can include one or more virtual machines 110A-110B and execute operating systems ("host OS") 105A-105B to manage resources (e.g., CPU 130A-130B, memory 135A-135B, physical devices, etc.), respectively. The virtual machines 110A-110B can run a guest operating system ("guest OS").

The host OS 105A-105B can include hypervisors 115A-115B. The hypervisors 115A-115B can also be known as a virtual machine monitor (VMM) or a kernel-based hypervisor. The hypervisors 115A-115B can be part of the host OS 105A-105B, run on top of the host OS 105A-105B, or run directly on the host hardware without an operating system beneath it. The hypervisors 115A-115B can assign physical devices to the virtual machines 110A-110B and can expose the physical devices to the guest OS of the virtual machines 110A-110B as a part of the virtual machines 110A-110B. In some implementations, the hypervisors 115A-115B can include migration agents 120A-120B and virtual machine hardware configuration components 125A-125B. Although the migration agents 120A-120B and virtual machine hardware configuration components 125A-125B are shown as a part of the hypervisors 115A-115B, they can be separate components coupled to hypervisors 115A-115B.

The migration agents 120A-120B at the respective host computer system 101A-101B manage migration of the source virtual machine 110A to the destination virtual machine 110B in accordance with commands from a host controller 102. Details about the host controller 102 will be describe below. In some implementations the migration agents 120A-120B notify the virtual machine hardware configuration components 125A-125B of a progress of the migration. The virtual machine hardware configuration components 125A-125B manage hardware configuration of the respective virtual machines 110A-110B by notifying the respective virtual machines 110A-110B a change in the respective hardware configuration before and after the migration and subsequently, providing the appropriate hardware configuration data structure to the respective virtual machines 110A-110B.

As an example, a hardware configuration data structure can be a hardware configuration table (hereinafter, "ACPI table") generated in accordance with the Advanced Configuration and Power Interface (ACPI) Specification. The ACPI table can be an extended system description table (XSDT), a differentiated system description table (DSDT), and/or a secondary system description table (SSDT). Some ACPI tables (e.g., XSDT) can include pointers to a table that contains hardware configuration definitions such as the power state and the CPU allocation. Other ACPI tables (e.g., DSDT and SSDT) can correspond to such a hardware configuration table describing the power state and the CPU allocation, for example. Such hardware configuration data structures before and after the migration can be different when the underlying physical devices at the destination host computer system 101B (e.g., CPU 130B, memory 135B, and physical devices) are different from underlying physical devices at the source host computer system 101A (e.g., CPU 130A, memory 135A, and physical devices). Details about functionality of virtual machine hardware configuration components 125A-125B are described below with respect to FIG. 2.

The host controller 102 can manage migration of a source virtual machine 110A to a destination virtual machine 110B by coordinating with the migration agents 120A and 120B at the host computer systems 101A and 101B. The host controller 102 can reside on a designated computer system (e.g., a server computer, a desktop computer, etc.) or be part of the host computer systems 101A and 101B or another machine. The host controller 102 can issue a request to migrate the source virtual machine 110A from the source host computer system 101A to the destination host computer systems 101B. In some implementations, the host controller 102 can provide the request in response to a triggering event such as a system administrator's migration request, system conditions (e.g., resource utilization by the source host computer system 101A exceeding a threshold). After the source virtual machine 110A has been migrated to the destination host computer system 101B, the host controller 102 can instruct the destination host computer system 101B to start the migrated virtual machine 110B via the migration agent 120B.

The "source" and "destination" designations for the host computer systems, hypervisors, virtual machines, migration agents, and hardware configuration monitors are provided for reference purposes in illustrating example implementations of the migration process according to embodiments.

Figure 2:
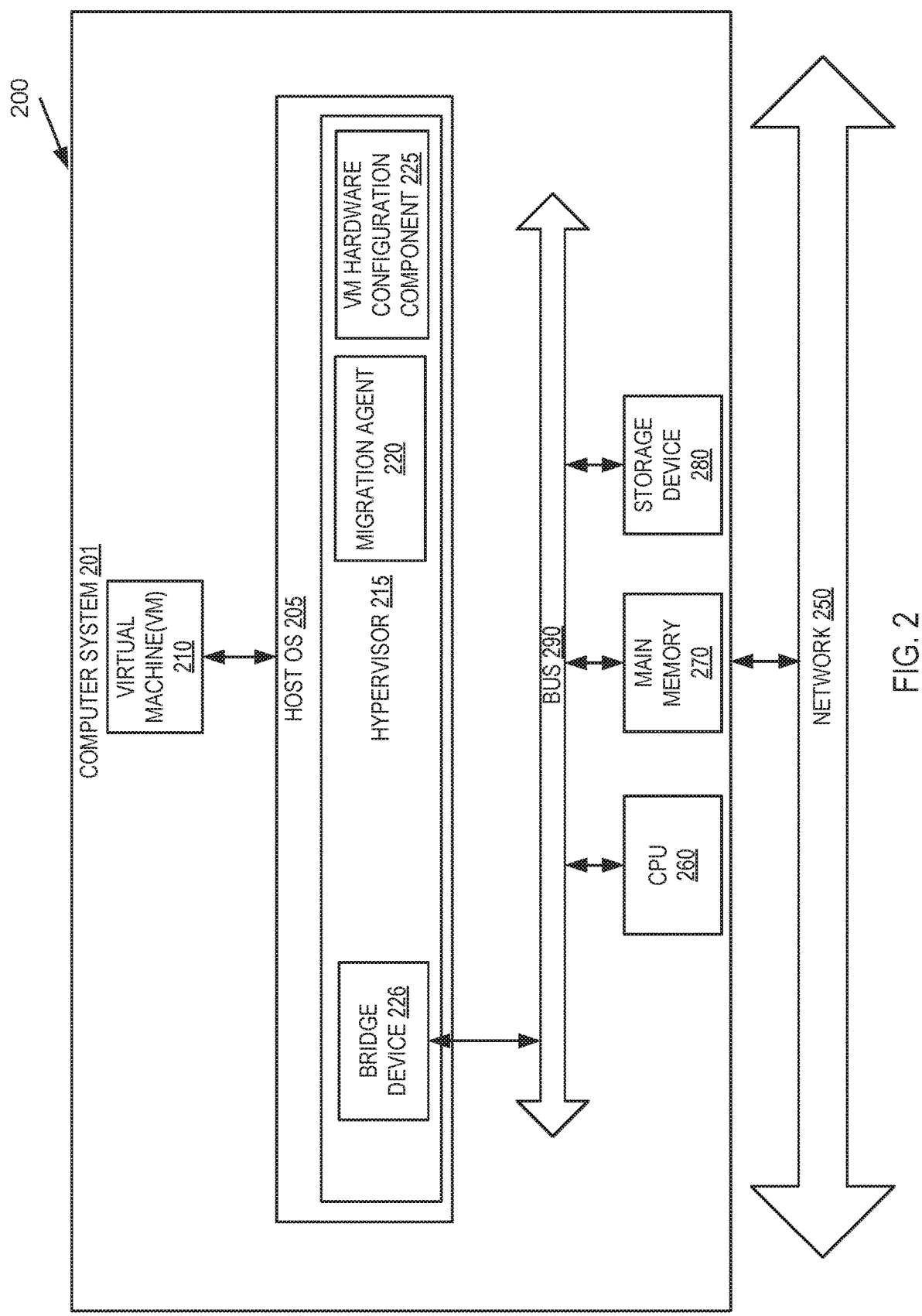
FIG. 2 is a block diagram that depicts an illustrative host computer system architecture, in accordance with one or more aspects of the present disclosure.

FIG. 2 is a block diagram 200 that depicts an illustrative host computer system architecture, in accordance with one or more aspects of the present disclosure. It should be noted that other architectures for computer system 201 are possible, and that the implementation of a computer system utilizing embodiments of the disclosure are not necessarily limited to the specific architecture depicted by FIG. 2. The computer system 201 can represent the source host computer system 101A or the destination host computer system 101B of FIG. 1.

As shown in FIG. 2, the computer system 201 is connected to a network 250. The network 250 can be a private network (e.g., a local area network (LAN), a wide area network (WAN), intranet, etc.) or a public network (e.g., the Internet).

The computer system 201 includes central processing units (CPUs) 260, main memory 270, which can include volatile memory devices (e.g., random access memory (RAM)), non-volatile memory devices (e.g., flash memory), and/or other types of memory devices, and storage device 280 (e.g., a magnetic hard disk, a Universal Serial Bus [USB] solid state drive, a Redundant Array of Independent Disks [RAID] system, a network attached storage [NAS] array, etc.), connected by a bus 290 (e.g., a Peripheral Component Interconnect [PCI] bus, a Universal Serial Bus [USB}, etc.). The computer system 201 can be a server, a mainframe, a workstation, a personal computer (PC), a mobile phone, a palm-sized computing device, etc. It should be noted that although, for simplicity, a single CPU is depicted in FIG. 2, in some other embodiments computer system 200 can comprise a plurality of CPUs. Similarly, in some other embodiments computer system 200 can comprise a plurality of storage devices 280, rather than a single storage device 280.

The computer system 200 runs a host operating system (OS) 205, which comprises software, hardware, or both, that manages the hardware resources of the computer system and that provides functions such as inter-process communication, scheduling, virtual memory management, and so forth. In some examples, host operating system 205 also comprises a hypervisor 215, which provides a virtual operating platform for virtual machine 210 and that manages its execution. The virtual machine 210 is a software implementation of a machine that executes programs as though it were an actual physical machine. It should be noted that although, for simplicity, a single virtual machine is depicted in FIG. 2, in some other embodiments computer system 201 can host a plurality of virtual machines. The virtual machine 210 is described in more detail below with respect to FIG. 3. It should be noted that in some other examples, the hypervisor 215 can be external to the host OS 205, rather than being embedded within host OS 205.

The hypervisor 215 can include a migration agent 220, a virtual machine hardware configuration component 225, and a bridge device 226. The bridge device 226 enables the virtual machine 210 to utilize the underlying physical devices. For example, the bridge device 226 (e.g., a PCI bridge device, etc.) can be a physical device or a virtual device. The bridge device 226 can have a set of slots (e.g., PCI express slots, etc.) and be capable of converting individual data items pertaining to multiple read and/or write transactions on bus 290 into one larger set of data.

The migration agent 220 manages migration of a virtual machine 210 to or from the computer system 201. In some implementations, the migration agent 220 can receive a request to migrate the virtual machine 210 to another computer system from a host controller (e.g., the host controller 102 of the FIG. 1). In response, the migration agent 220 can copy data from memory assigned to the virtual machine 210 over to the other computer system. During or after the migration, the migration agent 220 can notify the virtual machine hardware configuration component 225 about the progress of the migration. For example, the migration agent 220 can provide a part of the state of the virtual machine 210 to the virtual machine hardware configuration component 225. In some other implementations, the migration agent 220 can receive instruction from the host controller (e.g., the host controller 102) to migrate a virtual machine from another computer system to the virtual machine 210 of the computer system 201. Furthermore, the migration agent 220 can notify the virtual machine hardware configuration component 225 about the progress of the migration during or after the migration. The migration agent 220 can also start the virtual machine 210.

The virtual machine hardware configuration component 225 manages hardware configuration of the virtual machine 210. The hardware configuration can include, for example, power states supported by central processing units (CPUs) allocated to the virtual machine 210 at the computer system 201 and a number of CPUs allocated to the virtual machine. In some implementations, the virtual machine hardware configuration component 225 can generate a data structure (e.g., a table or a list) for hardware configuration of the virtual machine 210. For example, the virtual machine hardware configuration component 225 can generate the hardware configuration data structure when the virtual machine 210 is initiated at the computer system 201 after the migration or a power-on. The hardware configuration data structure can correspond to hardware configuration tables ("ACPI tables") complying with the Advanced Configuration and Power Interface (ACPI) Specification. Such ACPI tables can include an extended system description table (XSDT), a differentiated system description table (DSDT), and/or a secondary system description table (SSDT). Furthermore, in case the computer system 201 corresponds to the source host computer system, the virtual machine hardware configuration component 225 can load the hardware configuration data structure to a memory (not illustrated) accessible by the virtual machine 210 (e.g., the guest OS of the virtual machine 210). As a part of the migration, such memory is migrated from the source host computer system (e.g., the computer system 201) to the destination host computer system.

In case the virtual machine 210, has been migrated to the computer system 201 (i.e., a destination host computer system), the virtual machine hardware configuration component 225 can receive the ACPI tables from a source host computer system from where the virtual machine 210 has migrated. The received ACPI tables can correspond to the ACPI tables that were loaded to the virtual machine 210 when the virtual machine 210 was running at the source host computer system. The migrated virtual machine 210 can be started at the computer system 201. In response to receiving the ACPI tables from the source host computer system, the virtual machine hardware configuration component 225 can compare the received ACPI tables with the ACPI tables generated for the migrated virtual machine 210 at the computer system 201. The virtual machine hardware configuration component 225 can detect a difference between the two ACPI tables. In case the two sets of tables are different, the virtual machine hardware configuration component 225 can notify the migrated virtual machine 210 of the change in the hardware configuration. Upon receiving a request from the virtual machine 210 to provide the new hardware configuration information, the virtual machine hardware configuration component 225 can provide to the virtual machine the ACPI tables generated for the migrated virtual machine 210 at the computer system 201. In case the two sets of tables match, no notification to the virtual machine 210 is needed.

In another example, when the virtual machine 210 is migrated from the computer system 201 to a destination host computer system, the virtual machine hardware configuration component 225 can receive ACPI tables from the destination host computer system. In response, the virtual machine hardware configuration component 225 can compare the received ACPI tables with the ACPI tables generated for the virtual machine 210 when the virtual machine 210 was initiated at the computer system 201 before the migration. In case the virtual machine hardware configuration component 225 detects a difference between the two sets of tables, the virtual machine hardware configuration component 225 can notify the destination host computer system of a hardware configuration change. That is, the virtual machine hardware configuration component 225 communicates to the destination host computer system that hardware configuration of the migrated virtual machine should be updated. As a result, the destination host computer system can provide the migrated virtual machine the ACPI table that was sent to the virtual machine hardware configuration component 225 to the migrated virtual machine for the update.

Furthermore, in some embodiments where the computer system 201 corresponds to the source host computer system, the virtual machine hardware configuration component 225 can generate instructions for managing an update of hardware configuration for the respective virtual machine based on the hardware configuration data structures (e.g., the ACPI tables). The instructions can include instructions to detect hardware configuration change notification, to unload existing hardware configuration data structure from memory accessible by the guest OS of the virtual machine 210, to request new hardware configuration data structure from a hypervisor of a destination host computer system, and to load the new hardware configuration data structure into the memory accessible by the guest OS of the virtual machine 210. Accordingly, the virtual machine hardware configuration component 225 can provide the instructions with the ACPI tables to the virtual machine 210 so that an outdated hardware configuration data structure is unloaded from the virtual machine 210 and an appropriate hardware configuration data structure is loaded to the virtual machine 210. In some embodiments, the virtual machine hardware configuration component 225 or the hypervisor 215 of the source host computer system could have loaded the old hardware configuration data structure into the memory accessible by the guest OS of the virtual machine 210. The guest memory (including the memory buffer in which the old hardware configuration data structure is stored) can be migrated from the source host computer system to the destination host computer system. Upon detecting the hardware configuration change notification, the old hardware configuration data structure (that was previously retrieved before the detection of the hardware configuration change notification) is unloaded from the migrated guest memory, in accordance with the instructions.

Figure 3:
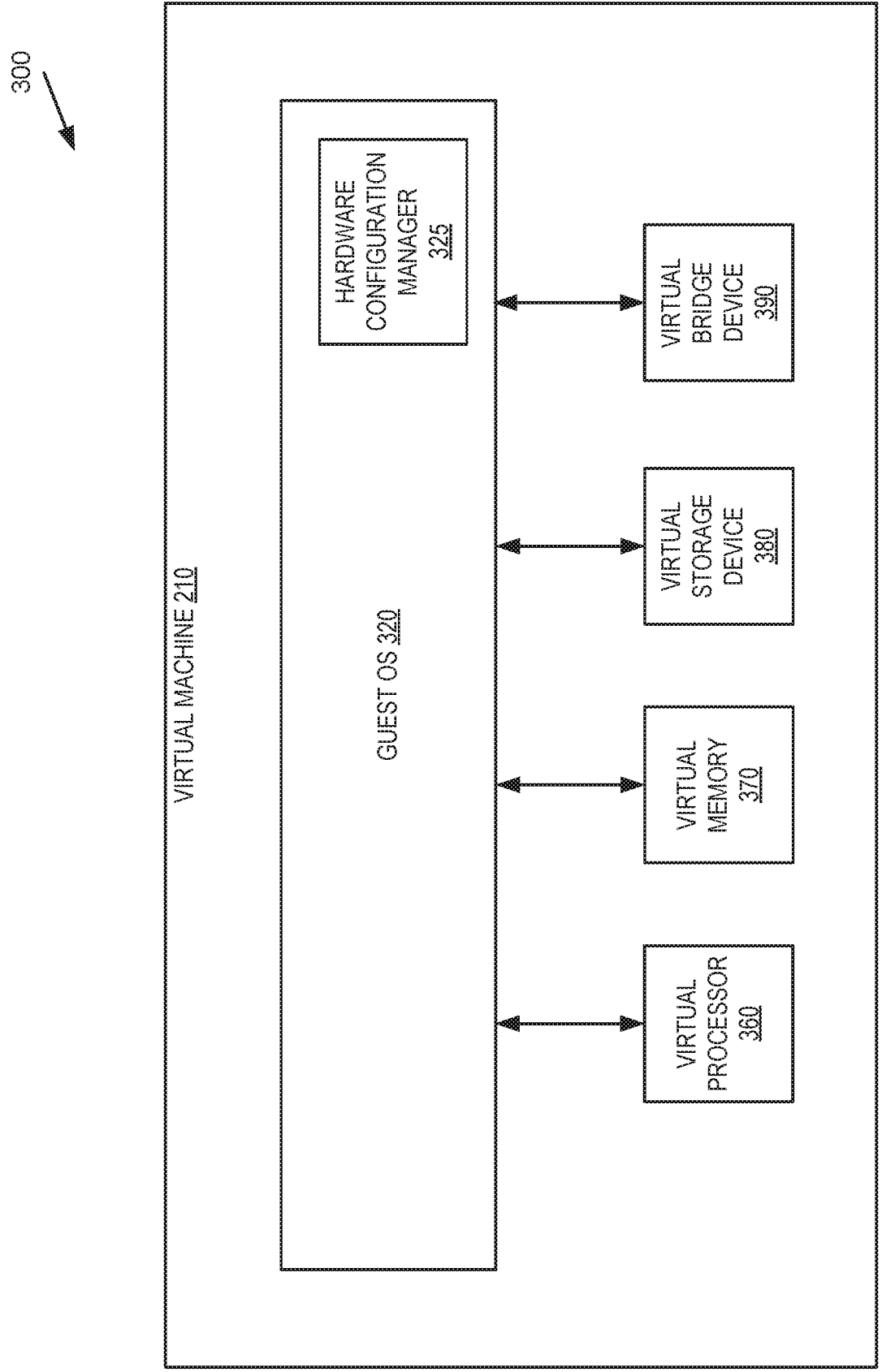
FIG. 3 is a block diagram that depicts elements of the virtual machine, in accordance with one or more aspects of the present disclosure.

FIG. 3 is a block diagram 300 that depicts elements of the virtual machine 210, in accordance with one or more aspects of the present disclosure. As shown in FIG. 3, virtual machine 210 includes a guest operating system ("guest OS") 320, a virtual processor 360, a virtual memory 370, a virtual storage device 380, and a virtual bridge device 390.

The virtual processor 360 emulates a physical processor and maps to central processing unit (CPU) 260. The virtual memory 370 maps virtual addresses of virtual machine 210 to addresses of the host OS 205's virtual memory, which in turn maps to physical addresses in main memory 270. The virtual storage device 380, similar to the virtual processor 360, emulates a physical storage device and maps to storage device 280. Furthermore, the virtual bridge device 390 emulates and maps to the bridge device 226. In one embodiment, hypervisor 215 manages these mappings in a transparent manner, so that guest OS 320 and applications executing on virtual machine 210 can interact with virtual processor 360, virtual memory 370, virtual storage device 380 and virtual bridge device 390 as though they were actual physical entities. In embodiments where computer system 300 include multiple CPUs, rather than a single CPU, the virtual machine 210 can also include multiple virtual processors 360. Similarly, in embodiments where computer system 200 comprises multiple storage devices 280, rather than a single storage device, the virtual machine 210 can also comprise multiple virtual storage devices 380.

The guest OS 320 manages the execution of programs within virtual machine 210. The guest OS 320 can be software, hardware, or both. In some implementations, the guest OS 320 includes a hardware configuration manager 325 that receives messages from the hypervisor 215 indicating that one or more hardware configuration data structures should be updated. In response, the hardware configuration manager 325 can request the hypervisor 215 to provide new hardware configuration data structures to be loaded to the guest OS 320. Further details of the hardware configuration manager 325 will be described below with respect to FIGS. 4 and 5.

Figure 4:
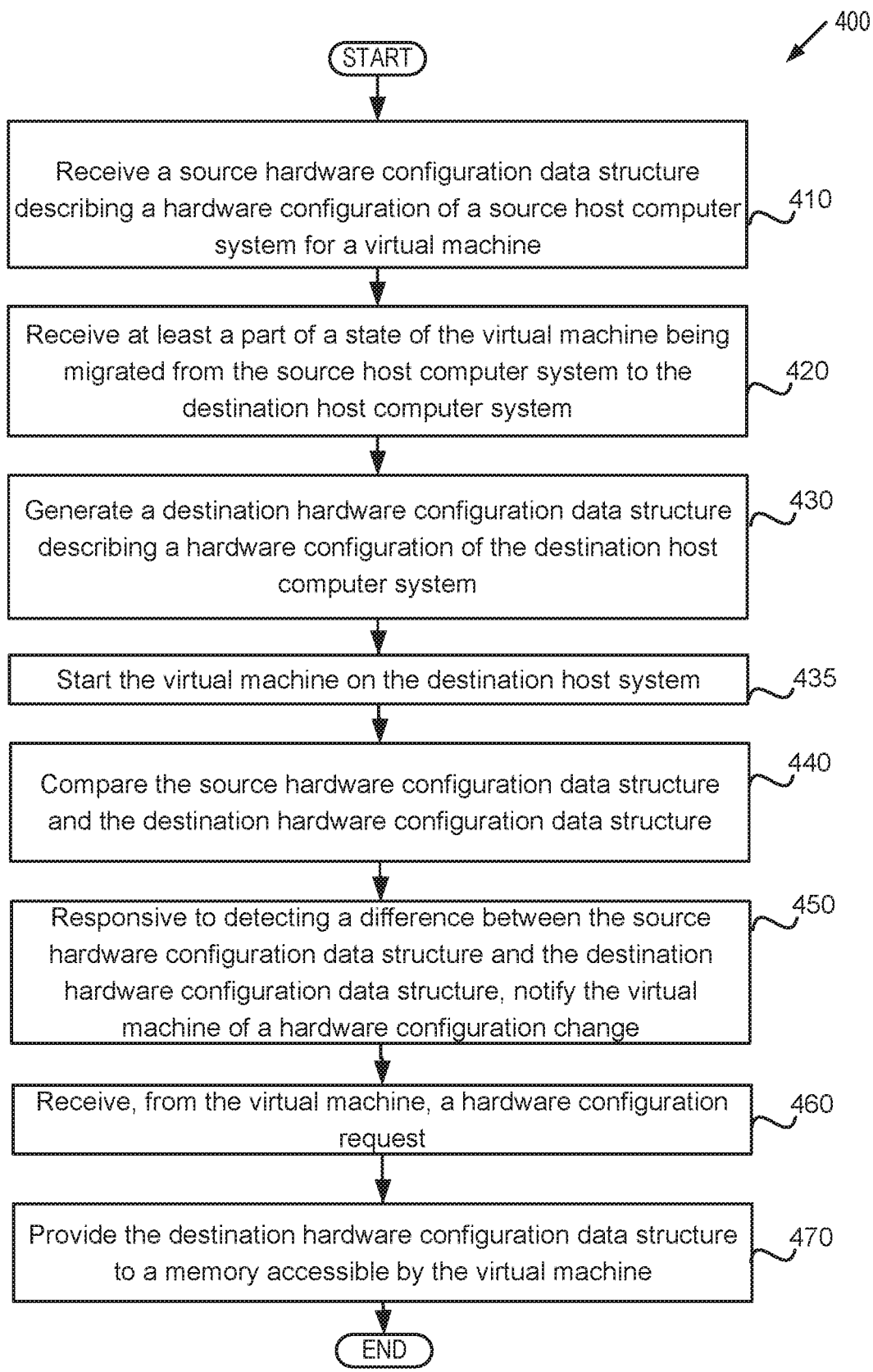
FIG. 4 is a flow diagram illustrating a method for a hardware configuration management in association with a virtual machine migration in accordance with one or more aspects of the present disclosure.

FIG. 4 is a flow diagram illustrating a method 400 for a hardware configuration management in association with a virtual machine migration in accordance with one or more aspects of the present disclosure. The method 400 illustrates an example process for notifying a virtual machine to update hardware configuration in accordance with some embodiments of the present disclosure.

The method 400 can be performed by processing devices that can comprise hardware (e.g., circuitry, dedicated logic, programmable logic, microcode, etc.), executable code (such as is run on a general-purpose computer system or a dedicated machine), or a combination of both. The method 400 and its individual functions, routines, subroutines, or operations can be performed by one or more processors of the computer device executing the method. In certain implementations, the method 400 can be performed by a single processing thread. Alternatively, the method 400 can be performed by two or more processing threads, each thread executing one or more individual functions, routines, subroutines, or operations of the method. In an illustrative example, the processing threads implementing the method 400 can be synchronized (e.g., using semaphores, critical sections, and/or other thread synchronization mechanisms). Alternatively, the processes implementing the method 400 can be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, the method 400 can be performed by a destination host computer system 101B or in particular, the destination hypervisor 115B as shown in FIG. 1.

Referring to FIG. 4, the method 400 begins at block 410 where the processing device of the destination host computer system receives a source hardware configuration data structure. In some implementations, the source hardware configuration data structure can describe a hardware configuration of a source host computer system for a virtual machine. As an example, a hardware configuration can correspond to configuration of a power state supported by computer processing units (CPUs) allocated to the virtual machine at the respective host computer system, a number of CPUs allocated to the virtual machine, and etc.

The source host computer system can generate the source hardware configuration data structure when a virtual machine is initiated on the source host computer system. For example, the source host computer system can generate hardware configuration tables (hereinafter, "ACPI tables") in accordance with the Advanced Configuration and Power Interface (ACPI) Specification. Such ACPI tables can include an extended system description table (XSDT), a differentiated system description table (DSDT), and/or a secondary system description table (SSDT). Some ACPI tables, such as the XSDT, can include pointers to a table that contains hardware configuration definitions such as the power state and the CPU allocation. For example, the XSDT can include a pointer to an SSDT and a fixed ACPI description table (FADT). Accordingly, Other ACPI tables can describe system configuration, such as configuration of underlying hardware devices, the power state and the CPU allocation. For example, the FADT can contain information about system power management policy for supporting power or sleep state of the respective system (the FADT can also include a pointer to a DSDT). As another example, the DSDT can contain configuration information of underlying input and output (I/O) device, memory device, peripheral control interface (PCI), a processor topology, and etc. The SSDT is a continuation of DSDT. Accordingly, SSDT can contain similar configuration information described above. Furthermore, the hypervisor of the source host computer system can load the ACPI table(s) into a memory accessible to the guest OS of the virtual machine. As a part of the migration, the guest memory (including the memory buffer in which the old hardware configuration data structure is stored) can be migrated from the source host computer system to the destination host computer system. Upon detecting the hardware configuration change notification, the old hardware configuration data structure (that was previously retrieved before the detection of the hardware configuration change notification) is unloaded from the migrated guest memory, in accordance with the instructions.

In some embodiments, the source host computer system can also generate virtual machine hardware configuration instructions, along with the ACPI tables. The instructions can manage hardware configuration based on the ACPI table(s) for the respective virtual machine. The source host computer system can generate the instructions for updating hardware configuration of the respective virtual machine under certain conditions. For example, the source host computer system can provide the instructions that, in response to detecting notification indicating that the current ACPI table(s) are outdated (or that the source hardware configuration data structure is different from the destination hardware configuration data structure), update the hardware configuration by unloading current ACPI table(s) from the respective virtual machine, requesting new ACPI table(s) to a hypervisor of the respective host computer system, and loading the new ACPI table(s).

Accordingly, in one implementation, when the notification is detected, the virtual machine can, in accordance with the instructions, request new ACPI table(s) from the hypervisor of the host computer system. The hardware configuration data structure that was loaded to the migrated memory by the hypervisor of the source host computer system can be unloaded from the guest-accessible memory at the destination host computer system.

At block 420, the processing device of the destination host computer system receives at least a part of a state of a virtual machine being migrated from the source host computer system to the destination host computer system. In some implementations, the state of the virtual machine being migrated can correspond to a progress or a percentage of the migration. In one implementation, a part of the state can be an indication (e.g., a number or a percentage) of an amount of the virtual machine's memory that has been copied over to the destination host computer system. In another implementation, a part of the state can correspond to an estimated time left to transfer the remaining data (e.g., the virtual machine's memory) to the destination host computer system. Accordingly, the processing device can determine that the migration of the virtual machine has been completed based on the part of the state of the virtual machine. For example, the processing device can determine the completion of the migration when there is no more memory to be transferred, when the percentage of the migration reaches a 100%, or when the estimated time left to migrate becomes zero. In other implementations, the processing device can determine the progress of the migration by determining an amount of the virtual machine memory that have been copied to the destination host computer system, instead of receiving at least a part of a state of a virtual machine being migrated.

At block 430, the processing device of the destination host computer system generates a destination hardware configuration data structure. Similar to the source hardware configuration data structure described above, the destination hardware configuration data structure can describe a hardware configuration of the destination host computer system for the virtual machine (e.g., the virtual machine migrated from the source host computer system to the destination host computer system). In some implementations, the processing device can generate the destination hardware configuration data structure depending on the progress of the migration of the virtual machine. In one implementation, the processing device can generate the destination hardware configuration data structure after determining that the migration of the virtual machine has been completed in view of the received part of the state of the virtual machine.

At block 435, the processing device of the destination host computer system starts the virtual machine on the destination host computer system. At block 440, the processing device of the destination host computer system compares the source host configuration data structure and the destination host configuration data structure. The processing device can determine whether the two data structure match. For example, in case of the configuration data structure being an ACPI table, the processing device can determine whether data structures and/or or individual data entries in the two ACPI tables are the same. In some implementations, the destination host computer system can compare the two data structures in response to determining that the virtual machine has been migrated to the destination host computer system as determined from the received part of the state of the virtual machine.

At block 450, responsive to detecting a difference between the source host configuration data structure and the destination host configuration data structure, the processing device of the destination host computer system notifies the virtual machine of a hardware configuration change. For example, after comparing the two data structure at block 440, in case the processing device detects that the two data structure does not match, the processing device can provide a notification to the virtual machine that has been migrated to the destination host computer system. In one implementation, the processing device can transmit an interrupt message representing that a new host configuration data structure should be loaded to the migrated virtual machine. That is, the processing device effectively notifies the virtual machine that the hardware configuration should be updated or the current hardware configuration is outdated. On the other hand, in case the processing device determines that the two data structure match, the processing device can not notify anything to the virtual machine regarding the comparison of block 440.

Subsequently, in further implementations, the processing device of the destination host computer system can receive, from the virtual machine, a hardware configuration request. In response to receiving the request, the processing device of the destination host computer system can provide the destination hardware configuration data structure to the virtual machine. In one implementation, the processing device can store the destination hardware configuration data structure to memory dedicated to the virtual machine (e.g., a memory mapped into an address space of the virtual machine). Accordingly, the virtual machine can update the hardware configuration by unloading the current hardware configuration data structure (i.e., the source hardware configuration data structure) and loading the destination hardware configuration data structure. As a result, the new hardware configuration of the virtual machine can be set as soon as the migration is completed.

Figure 5:
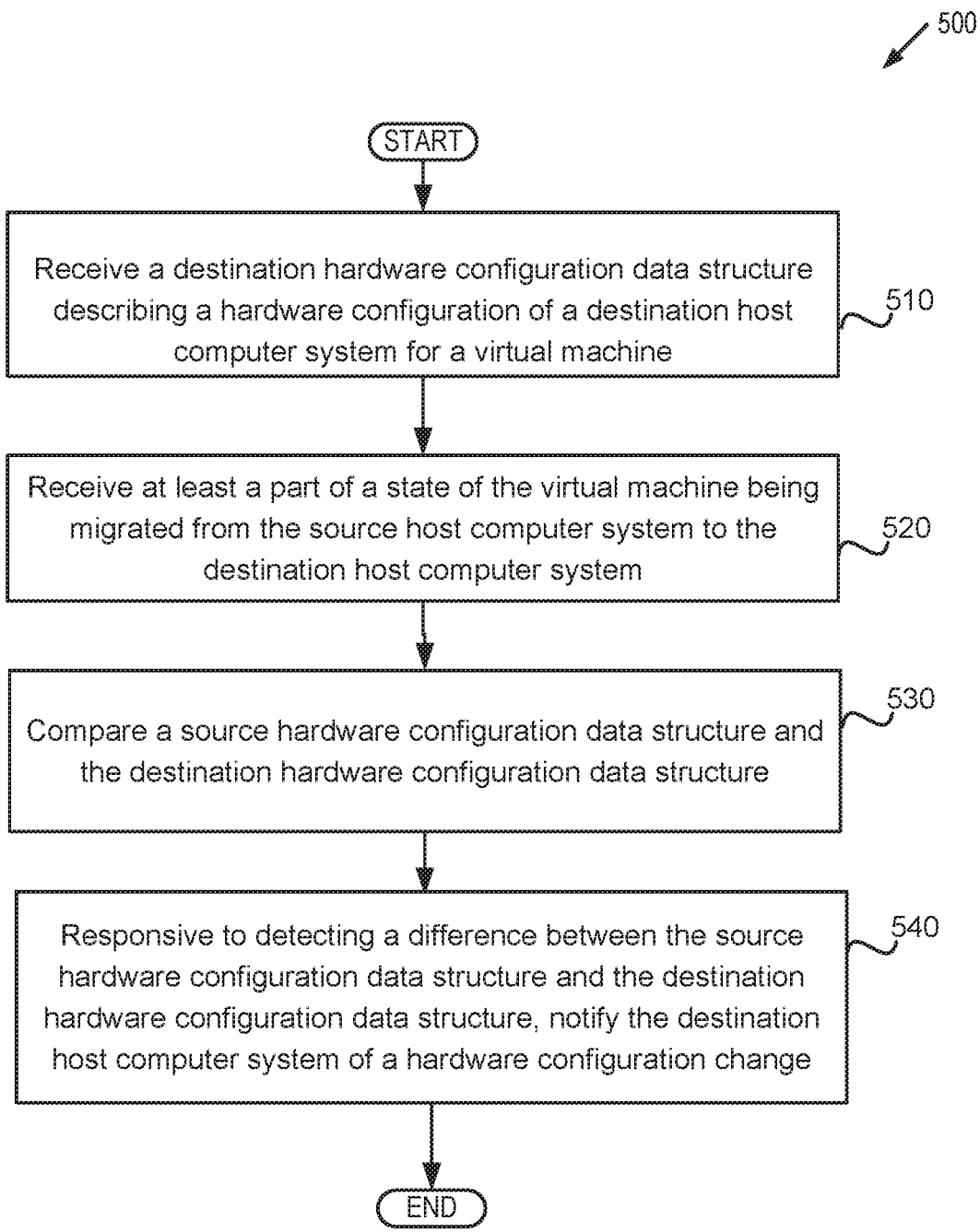
FIG. 5 is a flow diagram illustrating another method for a hardware configuration management in association with a virtual machine migration in accordance with one or more aspects of the present disclosure.

FIG. 5 is a flow diagram illustrating a method 500 for a hardware configuration management in association with a virtual machine migration in accordance with one or more aspects of the present disclosure. The method 500 illustrates an example process for notifying a virtual machine to update hardware configuration in accordance with some embodiments of the present disclosure.

The method 500 can be performed by processing devices that can comprise hardware (e.g., circuitry, dedicated logic, programmable logic, microcode, etc.), executable code (such as is run on a general-purpose computer system or a dedicated machine), or a combination of both. The method 500 and its individual functions, routines, subroutines, or operations can be performed by one or more processors of the computer device executing the method. In certain implementations, the method 500 can be performed by a single processing thread. Alternatively, the method 500 can be performed by two or more processing threads, each thread executing one or more individual functions, routines, subroutines, or operations of the method. In an illustrative example, the processing threads implementing the method 500 can be synchronized (e.g., using semaphores, critical sections, and/or other thread synchronization mechanisms). Alternatively, the processes implementing the method 500 can be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, the method 500 can be performed by the source host computer system 101A or in particular, the source hypervisor 115A as shown in FIG. 1.

Referring to FIG. 5, the method 500 begins at block 510 where the processing device of the source host computer system receives a destination hardware configuration data structure. In some implementations, the destination hardware configuration data structure can describe a hardware configuration of a destination host computer system for a virtual machine that has migrated from the source host computer system. As an example, a hardware configuration can correspond to configuration of a power state supported by computer processing units (CPUs) allocated to the virtual machine at the respective host computer system, a number of the CPUs allocated to the virtual machine, and etc. As an example, the destination hardware configuration data structure can correspond to hardware configuration tables (hereinafter, "ACPI tables") created in accordance with the Advanced Configuration and Power Interface (ACPI) Specification. Such ACPI tables can include an extended system description table (XSDT), a differentiated system description table (DSDT), and/or a secondary system description table (SSDT). As described above with respect to FIG. 4, some ACPI tables (e.g., XSDT) can include pointers to a table that contains hardware configuration definitions such as the power state and the CPU allocation. Other ACPI tables (e.g., DSDT and SSDT) can correspond to such a hardware configuration table describing the power state and the CPU allocation, for example.

In some implementations, the processing device of the source host computer system can receive the destination hardware configuration data structure after a virtual machine has migrated to the destination host computer system. In one implementation, the processing device of the source host computer system can receive the destination hardware configuration data structure by requesting the destination host computer system of the configuration data. For example, in response to determining that the migration has been completed (e.g., memory pages of the virtual machine have been completely copied over to the source host computer system), the processing device of the source host computer system can request the destination hardware configuration data structure to the destination host computer system. In another implementation, the processing device of the source host computer system can wait a threshold amount of time passed since the completion of the migration to request the destination hardware configuration data structure.

At block 520, the processing device of the source host computer system receives at least a part of a state of a virtual machine being migrated from the source host computer system to the destination host computer system. As describe with respect to block 420 of FIG. 4, the state of the virtual machine being migrated can correspond to a progress or a percentage of the migration. Accordingly, in one implementation, a part of the state can be an indication (e.g., a number or a percentage) of an amount of the virtual machine's memory that has been copied from the source host computer system to the destination host computer system. In another implementation, a part of the state can correspond to an estimated time left to transfer the remaining data (e.g., the virtual machine's memory) to the destination host computer system. Accordingly, the processing device can determine that the migration of the virtual machine has been completed based on the part of the state of the virtual machine. For example, the processing device can determine the completion of the migration when there is no more memory to be transferred, when the percentage of the migration reaches a 100%, or when the estimated time left to migrate becomes zero. In other implementations, the processing device can determine the progress of the migration by determining an amount of the virtual machine memory that have been copied to the destination host computer system, instead of receiving at least a part of a state of a virtual machine being migrated.

At block 530, the processing device of the source host computer system compares source host configuration data structure and the destination host configuration data structure. In some implementations, the processing device can access the source hardware configuration data structure that has been generated when the virtual machine was initiated on the source host computer system before the migration. For example, the source hardware configuration data structure can describe a hardware configuration of the source host computer system for a virtual machine. In one implementation, the source host computer system can generate hardware configuration tables (hereinafter, "ACPI tables") in accordance with the Advanced Configuration and Power Interface (ACPI) Specification. Such ACPI tables can include an extended system description table (XSDT), a differentiated system description table (DSDT), and/or a secondary system description table (SSDT). Some ACPI tables (e.g., XSDT) can include pointers to a table that contains hardware configuration definitions such as the power state and the CPU allocation. Other ACPI tables (e.g., DSDT and SSDT) can correspond to such a hardware configuration table.

Once the processing device of the source host computer system access the source hardware configuration data structure, the processing device can determine whether the source hardware configuration data structure data structure match the received destination hardware configuration data structure. For example, in case of the configuration data structure being an ACPI table, the processing device can determine whether data structures and/or individual data entries in the two ACPI tables are the same. In some implementations, the destination host computer system can compare the two data structures in response to determining that the virtual machine has been migrated to the destination host computer system as determined from the received part of the state of the virtual machine.

At block 540, responsive to detecting a difference between the destination host configuration data structure and the source host configuration data structure, the processing device of the source host computer system notifies the destination host computer system of a hardware configuration change. That is, the processing device notifies the destination host computer system that the hardware configuration of the migrated virtual machine should be updated or the current hardware configuration is outdated.

In response to receiving the notification, the destination host computer system can notify the migrated virtual machine about the difference between the destination host configuration data structure and the source host configuration data structure. As such, the virtual machine is notified to update hardware configuration. Subsequently, in order to update the configuration, the virtual machine can request a firmware (which is installed at the virtual machine) that manages the hardware configuration for the update. In response, the firmware of the virtual machine can request the destination host computer system to provide the destination hardware configuration data structure and update the hardware configuration. For example, the firmware can unload the source hardware configuration data structure and load the destination hardware configuration data structure received from the destination host computer system. That is, the firmware can replace hardware configuration information from the source hardware configuration data structure that is loaded in system memory of the guest operation system with the new hardware configuration from the destination hardware configuration data structure. Accordingly, the new hardware configuration of the virtual machine can be set as soon as the migration is completed.

In some embodiments, the processing device of the source host computer system can generate virtual machine hardware configuration instructions, along with the ACPI tables. The instructions can manage hardware configuration based on the ACPI table(s) for the respective virtual machine. The processing device can generate the instructions for updating hardware configuration of the respective virtual machine under certain conditions. For example, the processing device can provide the instructions that, in response to detecting notification indicating that the current ACPI table(s) are outdated (or that the source hardware configuration data structure is different from the destination hardware configuration data structure), update the hardware configuration by unloading current ACPI table(s) from the respective virtual machine, requesting new ACPI table(s) to a hypervisor of the respective host computer system, and loading the new ACPI table(s). Accordingly, in one implementation, the respective virtual machine can, in accordance with the instructions, request new ACPI table(s) from the hypervisor of the respective host computer system of the virtual machine. Upon receiving the new ACPI table(s), the respective virtual machine can load the new ACPI table(s) to the virtual machine for the update, in accordance with the instructions.

Figure 6:
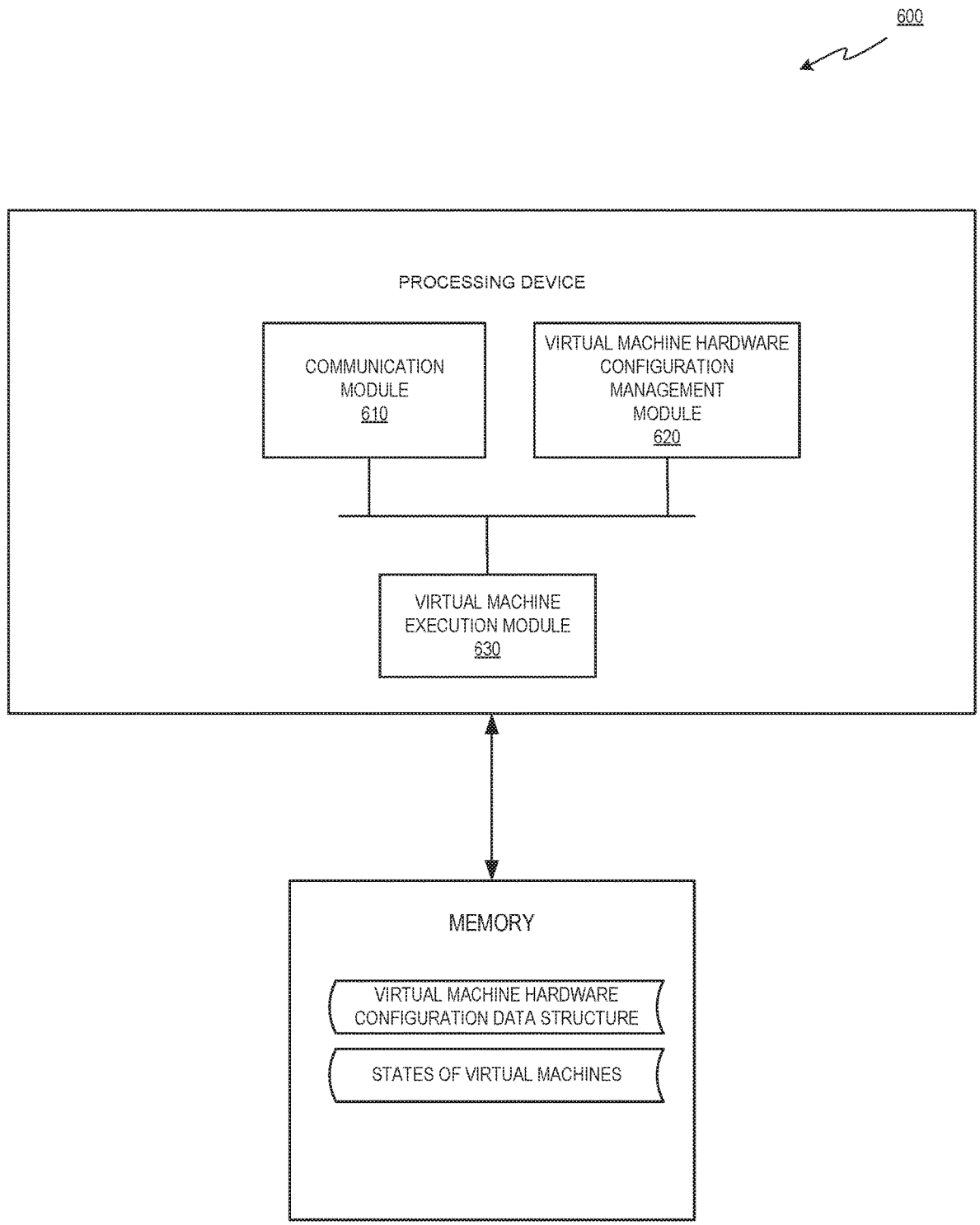
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 can be the same or similar to computer system 201 of FIG. 2, and can include one or more processing devices and one or more memory devices. In the example shown, computer system 600 can include a communication module 610, a hardware configuration management module 620, and a virtual machine (VM) execution module 630.

The communication module 610 communicates with other computer systems. In one implementation, the communication module 610 can communicate with another computer system, such as another host computer system (e.g., a source host computer system). For example, the communication module 610 can receive a source hardware configuration data structure from the source host computer system. The source hardware configuration data structure describes a hardware configuration of a source host computer system. The communication module 610 can also receive at least a part of a state of a virtual machine being migrated from the source host computer system. The communication module 610 can store the received source hardware configuration data structure and state of a virtual machine to the memory. Moreover, the communication module 610 can communicate with a virtual machine that is hosted by the computer system 600. In one implementation, the communication module 610 can notify the virtual machine of a hardware configuration change.

The hardware configuration management module 620 generates a host hardware configuration data structure that describes a hardware configuration of the system. The hardware configuration management module 620 can also store the host hardware configuration data structure to the memory. The hardware configuration management module 620 can also compare the received host hardware configuration data structure with the generated host hardware configuration data structure. The hardware configuration management module 620 can detect a difference between the two data structure. Accordingly, the hardware configuration management module 620 can request the communication module 610 to notify the virtual machine of the hardware configuration change.

The VM execution module 630 executes or starts virtual machines. In one implementation, the VM execution module 630 can start a migrated virtual machine using the state of virtual machine received via the communication module 610.

Figure 7:
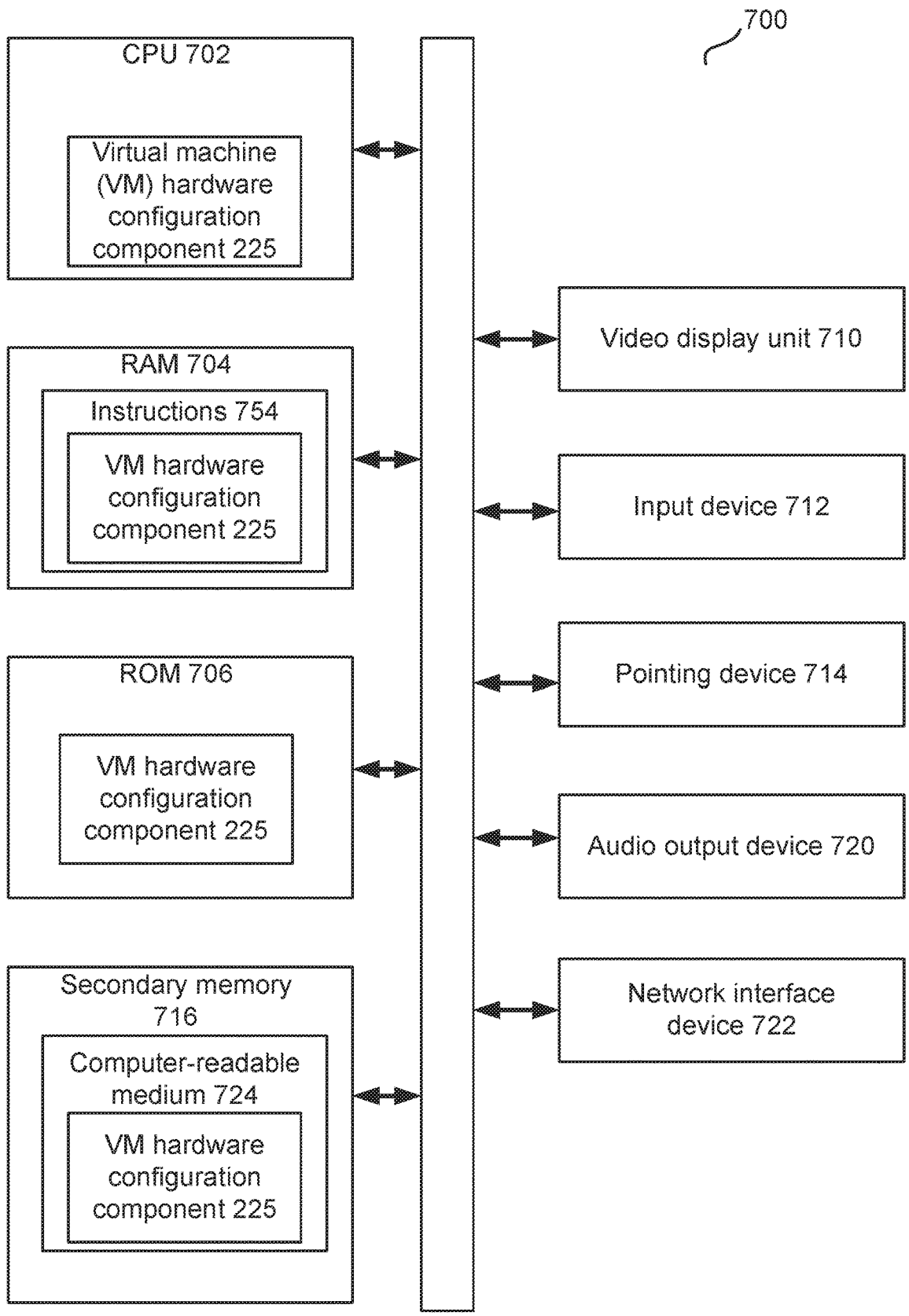
FIG. 7 is a block diagram that illustrates one implementation of a computer system in accordance with one or more aspects of the present disclosure.

FIG. 7 is a block diagram that illustrates one implementation of a computer system 700 in accordance with one or more aspects of the present disclosure. The computer system 700 can perform any one or more of the methods described herein. In an illustrative example, computer system 700 can correspond to the computer system 200 of FIG. 2.

In certain implementations, computer system 700 can be connected (e.g., via a network, such as a Local Area Network (LAN), an intranet, an extranet, or the Internet) to other computer systems. Computer system 700 can operate in the capacity of a server or a client computer in a client-server environment, or as a peer computer in a peer-to-peer or distributed network environment. Computer system 700 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 can comprise a physical processor 702, a volatile memory 704 (e.g., random access memory (RAM)), a non-volatile memory 706 (e.g., read-only memory (ROM) or electrically-erasable programmable ROM (EEPROM)), and a secondary memory 716 (e.g., a data storage device), which can communicate with each other via a bus 708.

Processor 702 can be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 can further comprise a network interface controller 722. Computer system 700 also can comprise a video display unit 710 (e.g., an LCD), an alphanumeric input device 712 (e.g., a keyboard), a pointing device 714 (e.g., a mouse), and an audio output device 720 (e.g., a speaker).

Secondary memory 716 can comprise a non-transitory computer-readable storage medium 724 on which can be stored instructions 754 encoding any one or more of the methods or functions described herein, including instructions encoding the virtual machine hardware configuration component 225 of FIG. 2 and the migration agent 220 of FIG. 2, and implementing methods 400 and 500 for managing hardware configuration of a virtual machine for migration.

Instructions 754 can also reside, completely or partially, within main memory 704 and/or within processor 702 during execution thereof by computer system 700, hence, main memory 704 and processor 702 can also constitute machine-readable storage media.

While computer-readable storage medium 724 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and software components, or only in software.

Other computer system designs and configurations may also be suitable to implement the system and methods described herein. The following examples illustrate various implementations in accordance with one or more aspects of the present disclosure.

Example 1 is a method comprising: receiving, by a destination host computer system, a source hardware configuration data structure describing a hardware configuration of a source host computer system; receiving at least a part of a state of a virtual machine being migrated from the source host computer system to the destination host computer system; generating a destination hardware configuration data structure describing a hardware configuration of the destination host computer system; and responsive to detecting a difference between the source host configuration data structure and the destination host configuration data structure, notifying the virtual machine of a hardware configuration change.

Example 2 includes the subject matter of example 1, further comprising: starting the virtual machine on the destination host computer system.

Example 3 includes the subject matter of example 1, further comprising: comparing the source host configuration data structure and the destination host configuration data structure.

Example 4 includes the subject matter of example 1, further comprising: receiving, from the virtual machine, a hardware configuration request; and providing the destination hardware configuration data structure to a memory accessible to the virtual machine.

Example 5 includes the subject matter of example 4, wherein providing the destination hardware configuration data structure to the virtual machine comprises: storing at least a part of the destination hardware configuration data structure in a memory mapped into an address space of the virtual machine.

Example 6 includes the subject matter of example 1, wherein the hardware configuration of the destination host computer system includes at least one of: a power state supported by a central processing unit (CPU) allocated to the virtual machine, or a number of CPUs allocated to the virtual machine.

Example 7 includes the subject matter of example 1, wherein the hardware configuration of the source host computer system includes at least one of: a power state supported by a CPU allocated to the virtual machine, or a number of CPUs allocated to the virtual machine.

Example 8 includes the subject matter of example 1, wherein the destination hardware configuration data structure corresponds to an advanced configuration and power interface (ACPI) data structure.

Example 9 includes the subject matter of example 1, the destination hardware configuration data structure comprises at least one of: an extended system description table (XSDT), a differentiated system description table (DSDT), or a secondary system description table (SSDT).

Example 10 includes the subject matter of example 1, wherein the source hardware configuration data structure corresponds to an advanced configuration and power interface (ACPI) data structure.

Example 11 includes the subject matter of example 1, the source hardware configuration data structure comprises at least one of: an XSDT, a DSDT, or a SSDT.

Example 12 is a method comprising: receiving, by a source host computer system, a destination hardware configuration data structure describing a hardware configuration of a destination host computer system; transmitting, to the destination host computer system, at least a part of a state of a virtual machine being migrated from the source host computer system to the destination host computer system; comparing a source host configuration data structure and the destination host configuration data structure, the source host configuration data structure describing a hardware configuration of the source host computer system; and notifying the destination host computer system of a difference between the destination host configuration data structure and the source host configuration data structure.

Example 13 includes the subject matter of example 12, wherein the part of the state of the virtual machine includes at least one of an indication of an amount of the virtual machine's memory that has been copied over to the destination host computer system, or an estimated time left to transfer remaining memory of the virtual machine to the destination host computer system.

Example 14 includes the subject matter of example 12, wherein the hardware configuration of the destination host computer system includes at least one of: a power state supported by a central processing unit (CPU) allocated to the virtual machine, or a number of CPUs allocated to the virtual machine.

Example 15 includes the subject matter of example 12, wherein the hardware configuration of the source host computer system includes at least one of: a power state supported by a CPU allocated to the virtual machine, or a number of CPUs allocated to the virtual machine.

Example 16 includes the subject matter of example 12, wherein the destination hardware configuration data structure corresponds to an advanced configuration and power interface (ACPI) data structure.

Example 17 includes the subject matter of example 12, wherein the destination hardware configuration data structure comprises at least one of: an extended system description table (XSDT), a differentiated system description table (DSDT), or a secondary system description table (SSDT).

Example 18 includes the subject matter of example 12, wherein the source hardware configuration data structure corresponds to an ACPI data structure; and the source hardware configuration data structure comprises at least one of: an XSDT, a DSDT, or a SSDT.

Example 19 includes the subject matter of example 12, wherein the operations further comprises: generating instructions: to detect notification of the difference between the destination virtual machine configuration data structure and the source virtual machine configuration data structure, to unload the source virtual machine configuration data structure, the source virtual machine configuration data structure was previously loaded by the source host computer system, to request the destination virtual machine configuration data structure to the destination host computer system, and to load the destination virtual machine configuration data structure to a memory accessible by the virtual machine, the memory migrated from the source host computer system to the destination host computer system.

Example 20 includes the subject matter of a system including: a memory; and a processor, operatively coupled to the memory, the processor to: receive, by the system, a source hardware configuration data structure describing a hardware configuration of a source host computer system for a virtual machine; receive at least a part of a state of the virtual machine being migrated from the source host computer system; generate a destination hardware configuration data structure describing a hardware configuration of the system; start the virtual machine on the system; compare the source host configuration data structure and the destination host configuration data structure; and responsive to detecting a difference between the source host configuration data structure and the destination host configuration data structure, notify the virtual machine of a hardware configuration change.

Example 21 includes the subject matter of example 20, wherein the processor is further to: receive, from the virtual machine, a hardware configuration request; and provide the destination hardware configuration data structure to the virtual machine.

Example 22 includes the subject matter of example 21, wherein to provide the destination hardware configuration data structure to the virtual machine further comprises: store at least a part of the destination hardware configuration data structure in a memory mapped into an address space of the virtual machine Example 23 includes the subject matter of example 20, wherein the hardware configuration of the system includes at least one of: a power state supported by a central processing unit (CPU) allocated to the virtual machine, or a number of CPUs allocated to the virtual machine.

Example 24 includes the subject matter of example 20, wherein the hardware configuration of the source host computer system includes at least one of: a power state supported by a CPU allocated to the virtual machine, or a number of CPUs allocated to the virtual machine.

Example 25 includes the subject matter of example 20, wherein: the destination hardware configuration data structure corresponds to an advanced configuration and power interface (ACPI) data structure.

Example 26 includes the subject matter of example 20, wherein the destination hardware configuration data structure comprises at least one of: an extended system description table (XSDT), a differentiated system description table (DSDT), or a secondary system description table (SSDT).

Example 27 includes the subject matter of example 20, wherein the source hardware configuration data structure corresponds to an ACPI data structure.

Example 28 includes the subject matter of example 20, wherein the source hardware configuration data structure comprises at least one of: an XSDT, a DSDT, or a SSDT.

Example 29 is an apparatus comprising: a processing device; and a means for receiving a source hardware configuration data structure describing a hardware configuration of a source host computer system for a virtual machine and for receiving at least a part of a state of the virtual machine being migrated from the source host computer system to the destination host computer system; a means for generating a destination hardware configuration data structure describing a hardware configuration of the destination host computer system for the virtual machine; a means for starting the virtual machine on the destination host computer system; a means for comparing the source host configuration data structure and the destination host configuration data structure; and a means for notifying the virtual machine of a hardware configuration change, responsive to detecting a difference between the source host configuration data structure and the destination host configuration data structure.

Example 30 is a system comprising: a memory; and a processing device operatively coupled to the memory, the processing device to implement the subject matter of any of examples 21-29.

Example 31 is a non-transitory machine-readable storage medium including instructions that, when accessed by a processing device, cause the processing device to implement the subject matter of any of examples 1-19.

Unless specifically stated otherwise, terms such as "receiving," "generating," "starting," "comparing," "notifying," "providing," "storing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving, by a destination host computer system, a source hardware configuration data structure describing a hardware configuration of a source host computer system for a virtual machine;
   receiving at least a part of a state of the virtual machine being migrated from the source host computer system to the destination host computer system;

generating a destination hardware configuration data structure describing a hardware configuration of the destination host computer system for the virtual machine;

starting the virtual machine on the destination host computer system;

comparing the source configuration data structure and the destination configuration data structure;

responsive to detecting a difference between the source configuration data structure and the destination configuration data structure, notifying the virtual machine of a hardware configuration change;

receiving, from the virtual machine, a hardware configuration request; and providing the destination hardware configuration data structure to the virtual machine.

2. The method of claim 1, wherein providing the destination hardware configuration data structure to the virtual machine comprises:

storing at least a part of the destination hardware configuration data structure in a memory mapped into an address space of the virtual machine.

3. The method of claim 1, wherein the hardware configuration of the destination host computer system includes at least one of: a power state supported by a central processing unit (CPU) allocated to the virtual machine, or a number of CPUs allocated to the virtual machine.

4. The method of claim 1, wherein the hardware configuration of the source host computer system includes at least one of: a power state supported by a CPU allocated to the virtual machine, or a number of CPUs allocated to the virtual machine.

5. The method of claim 1, wherein the destination hardware configuration data structure corresponds to an advanced configuration and power interface (ACPI) data structure.

6. The method of claim 1, wherein the destination hardware configuration data structure comprises at least one of: an extended system description table (XSDT), a differentiated system description table (DSDT), or a secondary system description table (SSDT).

7. The method of claim 1, wherein:

the source hardware configuration data structure corresponds to an ACPI data structure; and the source hardware configuration data structure comprises at least one of: an XSDT, a DSDT, or a SSDT.

8. A system comprising:

a memory; and a processor, operatively coupled to the memory, the processor to:

receive, by the system, a source hardware configuration data structure describing a hardware configuration of a source host computer system for a virtual machine;

receive at least a part of a state of the virtual machine being migrated from the source host computer system;

generate a destination hardware configuration data structure describing a hardware configuration of the system;

start the virtual machine on the system;

compare the source virtual machine configuration data structure and the destination virtual machine configuration data structure;

responsive to detecting a difference between the source virtual machine configuration data structure and the destination virtual machine configuration data structure, notify the virtual machine of a hardware configuration change;

receive, from the virtual machine, a hardware configuration request; and provide the destination hardware configuration data structure to another memory accessible by the virtual machine.

9. The system of claim 8, wherein to provide the destination hardware configuration data structure to the virtual machine further comprises:

store at least a part of the destination hardware configuration data structure in a memory mapped into an address space of the virtual machine.

10. The system of claim 8, wherein the hardware configuration of the system includes at least one of: a power state supported by a central processing unit (CPU) allocated to the virtual machine, or a number of CPUs allocated to the virtual machine.

11. The system of claim 8, wherein the hardware configuration of the source host computer system includes at least one of: a power state supported by a CPU allocated to the virtual machine, or a number of CPUs allocated to the virtual machine.

12. The system of claim 8, wherein the destination hardware configuration data structure corresponds to an advanced configuration and power interface (ACPI) data structures.

13. The system of claim 8, wherein the destination hardware configuration data structure comprises at least one of: an extended system description table (XSDT), a differentiated system description table (DSDT), or a secondary system description table (SSDT).

14. The system of claim 8, wherein:

the source hardware configuration data structure corresponds to an ACPI data structure; and the source hardware configuration data structure comprises at least one of: an XSDT, a DSDT, or a SSDT.

15. A non-transitory computer readable storage medium comprising instructions that, when executed by a processor, cause the processor to perform operations comprising:

receiving, by a source host computer system, a destination hardware configuration data structure describing a hardware configuration of a destination host computer system for a virtual machine;

transmitting, to the destination host computer system, at least a part of a state of the virtual machine being migrated from the source host computer system to the destination host computer system;

comparing a source virtual machine configuration data structure and the destination virtual machine configuration data structure, the source virtual machine configuration data structure describing a hardware configuration of the source host computer system; and notifying the destination host computer system of a difference between the destination virtual machine configuration data structure and the source virtual machine configuration data structure.

16. The non-transitory computer readable storage medium of claim 15, wherein the part of the state of the virtual machine includes at least one of an indication of an amount of the virtual machine's memory that has been copied over to the destination host computer system, or an estimated time left to transfer remaining memory of the virtual machine to the destination host computer system.

17. The non-transitory computer readable storage medium of claim 15, wherein the hardware configuration of the destination computer system includes at least one of: a power state supported by a central processing unit (CPU) allocated to the virtual machine, or a number of CPUs allocated to the virtual machine.

18. The non-transitory computer readable storage medium of claim 15, wherein the hardware configuration of the source computer system includes at least one of: a power state supported by a CPU of the source host computer system allocated to the virtual machine, or a number of CPUs allocated to the virtual machine.

19. The non-transitory computer readable storage medium of claim 15, wherein:
   the destination hardware configuration data structure corresponds to an advanced configuration and power interface (ACPI) data structure;
   the destination hardware configuration data structure comprises at least one of: an extended system description table (XSDT), a differentiated system description table (DSDT), or a secondary system description table (SSDT);
   the source hardware configuration data structure corresponds to an ACPI data structure; and
   the source hardware configuration data structure comprises at least one of: an XSDT, a DSDT, or a SSDT.

20. The non-transitory computer readable storage medium of claim 15, wherein the operations further comprises:
   generating instructions:
      to detect notification of the difference between the destination virtual machine configuration data structure and the source virtual machine configuration data structure,
      to unload the source virtual machine configuration data structure from a memory accessible by the virtual machine,
      to request the destination virtual machine configuration data structure to the destination host computer system, and
      to load the destination virtual machine configuration data structure from the memory accessible by the virtual machine, the memory migrated from the source host computer system to the destination host computer system.

* * * * *